United States Patent
Okamura

(10) Patent No.: US 9,658,729 B2
(45) Date of Patent: May 23, 2017

(54) FIXING STRUCTURE FOR TOUCH PANEL AND FRONT DESIGN SHEET AND DISPLAY UNIT WITH TOUCH PANEL

(71) Applicant: FANUC Corporation, Yamanashi (JP)

(72) Inventor: Hideki Okamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/746,899

(22) Filed: Jun. 23, 2015

(65) Prior Publication Data

US 2015/0378488 A1    Dec. 31, 2015

(30) Foreign Application Priority Data

Jun. 25, 2014   (JP) .................. 2014-130246

(51) Int. Cl.
*G06F 3/045*  (2006.01)
*G06F 1/16*  (2006.01)

(52) U.S. Cl.
CPC ............ *G06F 3/045* (2013.01); *G06F 1/1637* (2013.01)

(58) Field of Classification Search
CPC ........ G06F 3/041; G06F 3/0412; G06F 3/045; G06F 3/047; G06F 1/16; G06F 2203/04107; G06F 1/1637; G06F 1/1626; G06F 2203/04105; G06F 1/169; G02F 1/13338; G09G 5/00; G09G 5/003

USPC .......................................... 428/189; 345/173
See application file for complete search history.

(56) References Cited

U.S. PATENT DOCUMENTS

2009/0284487 A1    11/2009  Nakanishi et al.

FOREIGN PATENT DOCUMENTS

| JP | 2007-241811 A | 9/2007 |
| JP | 2009-277121 A | 11/2009 |
| JP | 2012-133580 A | 7/2012 |
| JP | 2012-141801 A | 7/2012 |
| JP | 2012-226395 A | 11/2012 |
| JP | 2014-2666 A | 1/2014 |

OTHER PUBLICATIONS

Translation of JP 2014-002666.*
Office Action dated on Jul. 28, 2015, corresponding to Japanese patent application No. 2014-130246.

* cited by examiner

*Primary Examiner* — Catherine A Simone
(74) *Attorney, Agent, or Firm* — Hauptman Ham, LLP

(57) ABSTRACT

A touch panel is configured so that a lower glass substrate with a very low thermal expansion coefficient, as its lower substrate, projects outwardly from outer edges of an upper film substrate. Since a front design sheet is secured to the lower glass substrate, a housing, which is a molded article, need not be provided with any area for the fixation of the front design sheet. Thus, the distance from the contour of a display unit to a display area can be reduced, so that the display unit can be reduced in size.

13 Claims, 6 Drawing Sheets

FIXING STRUCTURE FOR TOUCH PANEL AND FRONT DESIGN SHEET AND DISPLAY UNIT WITH TOUCH PANEL

RELATED APPLICATIONS

The present application claims priority to Japanese Application Number 2014-130246, filed Jun. 25, 2014, the disclosure of which is hereby incorporated by reference herein in its entirety.

BACKGROUND OF THE INVENTION

Field of the Invention

The present invention relates to a fixing structure for a front design sheet secured to the front surface of a display unit with touch panel of an electronic apparatus or the like, and a display unit with touch panel.

Description of the Related Art

Generally, in a display unit with touch panel attached to an electronic apparatus or the like, a front design sheet is attached to its front surface to protect the main body of a touch panel, hide electrodes and the like around the touch panel, and provide outstanding design properties for the display unit (see Japanese Patent Applications Laid-Open Nos. 2009-277121 and 2007-241811).

An example of a conventional display unit with touch panel will be described with reference to FIG. 8.

A display unit 1 with touch panel includes a touch panel 2, LCD panel (liquid-crystal display device) 3, housing (bezel) 4, front design sheet 5, double-sided tape 6 for front design sheet fixation, and double-sided tape 7 for touch panel fixation.

The touch panel 2 is disposed above the LCD panel 3. The touch panel 2 is secured to a first step portion of the housing 4 by the double-sided tape 7 for touch panel fixation. The front design sheet 5 is disposed on the top of the touch panel 2. The front design sheet 5 is secured to a second step portion of the housing 4 by the double-sided tape 6 for front design sheet fixation.

FIG. 9 is a view showing a profile of the touch panel 2 of FIG. 8.

The touch panel 2 includes a light-transmitting upper film substrate and a light-transmitting lower glass substrate 10. A light-transmitting upper conductive layer 9, such as an indium tin oxide layer, is formed on the lower surface of the upper film substrate 8. Further, a lower conductive layer 11 is formed on the upper surface of the lower glass substrate 10.

A plurality of dot spacers (not shown) of an insulating resin are formed at predetermined dot pitches on the upper surface of the lower conductive layer 11. A pair of upper electrode layers 12A and 12B are formed individually on the opposite ends of the upper conductive layer 9. Further, a pair of lower electrode layers (not shown) extending perpendicular to the upper electrode layers 12A and 12B are formed individually on the opposite ends of the lower conductive layer 11. A substantially frame-shaped spacer (not shown) is disposed between the upper film substrate 8 and the lower glass substrate 10 so that the upper conductive layer 9 on the upper film substrate 8 and the lower conductive layer 11 on the lower glass substrate 10 face each other with a predetermined space therebetween. The touch panel 2 shown in FIG. 9 is constructed in this manner.

The upper electrode layers 12A and 12B on the opposite ends of the upper conductive layer 9 and the lower electrode layers on the opposite ends of the lower conductive layer 11 are connected to an electronic circuit (not shown) of an input device through a flexible printed wiring board (not shown). This flexible printed wiring board is formed by covering a wire of, for example, copper foil by an insulating film.

The display unit 1 with touch panel is configured so that if an operator depresses the upper surface of the upper film substrate 8 by his/her finger, pen, or the like while visually recognizing the display on the LCD panel 3 on the back of the touch panel 2, the upper film substrate 8 bends so that a depressed part of the upper conductive layer 9 comes into contact with the corresponding part of the lower conductive layer 11. Voltages from the electronic circuit are sequentially applied to the upper electrode layers 12A and 12B and the lower electrode layers. The electronic circuit detects the depressed part based on the voltage ratio between these electrodes so that various functions of the input device can be changed.

As described above, the front design sheet 5 is affixed to a molded housing in a manner such that a resin sheet (e.g., PET sheet) covers the entire surface of the display unit 1 with a double-sided adhesive tape from the front side. Since the front design sheet 5 with very low rigidity is affixed directly to the molded housing 4, the front design sheet 5 may sometimes be wrinkled or deformed due to a difference in thermal expansion coefficient, in case of a change of temperature in the installation environment.

For a reduction in size and better design properties of the display unit 1, it is preferable that the distance (denoted by reference numeral 13 in FIG. 8) from the contour of the display unit 1 to a display area is as short as possible. It is necessary, however, to provide a sufficient fixing area for adhesive fixation of the touch panel 2 and the front design sheet 5 to the molded housing 4, and the presence of the fixing area hinders the reduction of the contour of the display unit 1 with respect to the display area. Since it is necessary to provide a region in which the touch panel 2 is secured to the housing 4 and a region in which the front design sheet 5 is secured to the housing 4, as shown in FIG. 8, the distance 13 from the contour to the display area becomes inevitably long.

In order to solve this problem, in a display unit disclosed in Japanese Patent Application Laid-Open No. 2007-241811, a front design sheet is affixed to a molded housing with a metal sheet therebetween, whereby the front design sheet is prevented from being wrinkled or deformed. However, this technique has a problem that the necessity of the metal sheet or other interposed parts results in an increase in the number of parts. Since the front design sheet is configured to be secured to the housing, moreover, it is not conducive to a reduction of the fixing area in size.

Furthermore, the electrode layers and the like are exposed to an ambient atmosphere on the outer peripheral end surfaces of the touch panel. If the electrode layers are mounted on an insufficiently sealed housing, therefore, they may suffer electrolytic corrosion or rust due to dust or water in the ambient atmosphere, possibly causing trouble.

SUMMARY OF THE INVENTION

Accordingly, an object of the present invention is to provide a fixing structure for a front design sheet, configured so that a part of a lower glass substrate with a very low thermal expansion coefficient, which is a lower substrate of a touch panel, projects outwardly from the outer edges of an upper film substrate and that the front design sheet is secured to the projected lower glass substrate to be prevented from being wrinkled or deformed by a temperature change, and a display unit with touch panel comprising the fixing structure.

In a fixing structure for a touch panel and a front design sheet according to the present invention, the touch panel comprises an upper film substrate, formed with an electrically conductive layer on the lower surface thereof, and a lower transparent substrate, formed with an electrically conductive layer on the upper surface thereof and facing the upper film substrate with a predetermined space therebetween, and the front design sheet is disposed above the touch panel. Further, the front design sheet and the lower transparent substrate are contoured so as to partially project outwardly from the outer edges of the upper film substrate, and the front design sheet is secured to the lower transparent substrate.

The lower surface of the front design sheet and the upper surface of the upper film substrate may be bonded to each other by an optically transparent material.

The outer periphery of an adhesive layer which adhesively secures the front design sheet and the lower transparent substrate may be sealed by a resin.

Further, a display unit with touch panel according to the present invention is configured so that the fixing structure for the touch panel and the front design sheet is secured to a housing and disposed above a display device.

According to the present invention, there can be provided a fixing structure for a front design sheet, configured so that a part of a lower glass substrate with a very low thermal expansion coefficient, which is a lower substrate of a touch panel, projects outwardly from the outer edges of an upper film substrate and that the front design sheet is secured to the projected lower glass substrate to be prevented from being wrinkled or deformed by a temperature change, and a display unit with touch panel comprising the fixing structure.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
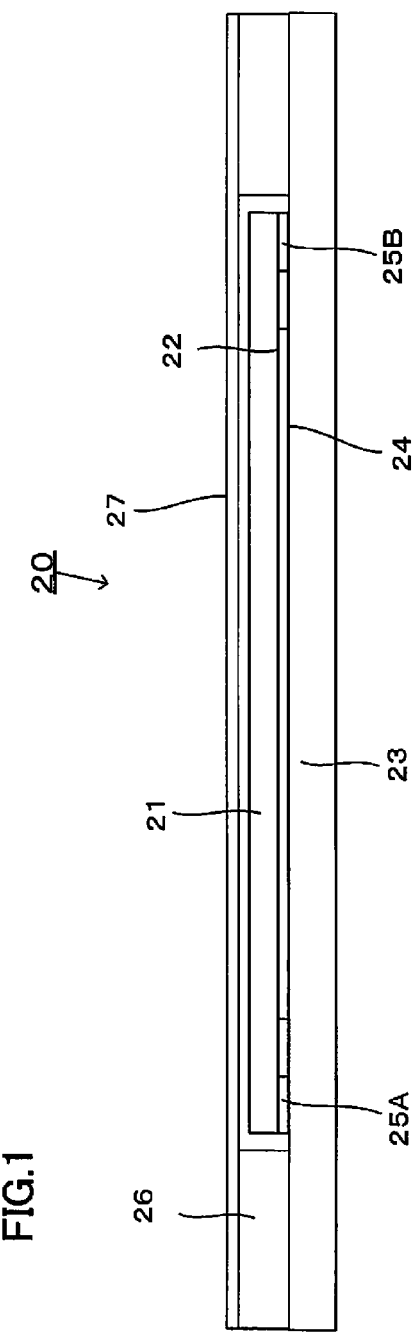
FIG. 1 is a view illustrating the configuration of a touch panel constituting a first embodiment of a fixing structure for the touch panel and a front design sheet according to the present invention.

The configuration of a touch panel constituting a first embodiment of a fixing structure for the touch panel and a front design sheet according to the present invention will first be described with reference to FIG. 1.

This touch panel 20 comprises a light-transmitting upper film substrate 21 and a light-transmitting lower glass substrate 23. A light-transmitting upper conductive layer 22, such as an indium tin oxide layer, is formed on the lower surface of the upper film substrate 21. Further, a lower conductive layer 24 is formed on the upper surface of the lower glass substrate 23. In the touch panels of this embodiment and alternative embodiments to be described later, an optically transparent resin substrate may be used in place of the lower glass substrate.

A plurality of dot spacers (not shown) of an insulating resin are formed at predetermined dot pitches on the upper surface of the lower conductive layer 24. A pair of upper electrode layers 25A and 25B are formed individually on the opposite ends of the upper conductive layer 22. Further, a pair of lower electrode layers (not shown) extending perpendicular to the upper electrode layers 25A and 25B are formed individually on the opposite ends of the lower conductive layer 24. A substantially frame-shaped spacer (not shown) is disposed between the upper film substrate 21 and the lower glass substrate 23 so that the upper conductive layer 22 on the upper film substrate 21 and the lower conductive layer 24 on the lower glass substrate 23 face each other with a predetermined space therebetween. The touch panel 20 shown in FIG. 1 is constructed in this manner.

The upper electrode layers 25A and 25B on the opposite ends of the upper conductive layer 22 and the lower electrode layers on the opposite ends of the lower conductive layer 24 are connected to an electronic circuit (not shown) of an input device through a flexible printed wiring board (not shown). This flexible printed wiring board is formed by covering a wire of, for example, copper foil by an insulating film.

The touch panel 20 shown in FIG. 1 is configured so that the lower glass substrate 23 with a very low thermal expansion coefficient projects outwardly from the outer edges of the upper film substrate 21. Thus, the area of the lower glass substrate 23 is larger than that of the upper film substrate 21. A front design sheet 27 is secured to that part of the lower glass substrate 23 which projects outwardly from the outer edges of the upper film substrate 21 by an adhesive (not shown) or a double-sided tape 26 for front design sheet fixation. In this way, the front design sheet 27 is prevented from being wrinkled or deformed by a temperature change.

Since the front design sheet 27 is secured to the lower glass substrate 23, as described above, it is not necessary to provide an area for the fixation of the front design sheet 27 in a housing which is a molded article. Thus, the distance from the contour of a display unit to a display area can be reduced, so that the display unit can be reduced in size. Further, the electrode layers (upper electrode layers 25A and 25B and lower electrode layers (not shown)) on the end surfaces of the touch panel and the like are enclosed by the double-sided tape 26 for front design sheet fixation. Thus, the interior of the touch panel 20 can be protected from dust and water in an ambient atmosphere, so that trouble can be reduced and the reliability can be improved.

The configuration of a touch panel constituting a second embodiment of the fixing structure for the touch panel and the front design sheet according to the present invention will now be described with reference to FIG. 2.

Figure 2:
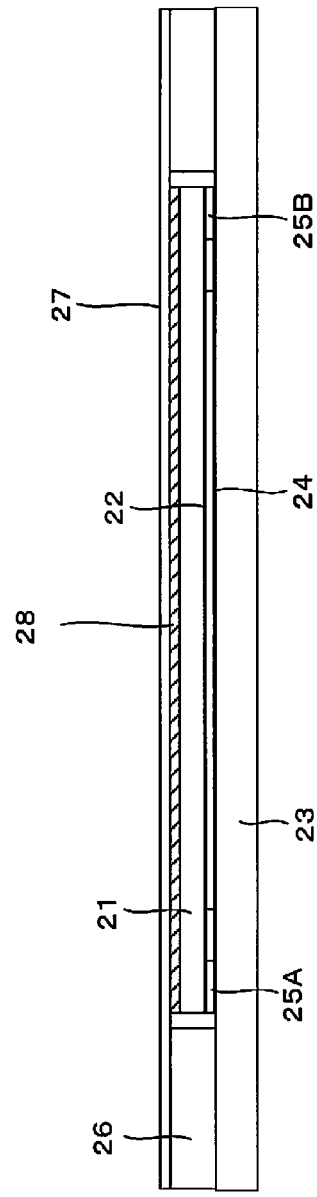
FIG. 2 is a view illustrating the configuration of a touch panel constituting a second embodiment of the fixing structure for the touch panel and the front design sheet according to the invention.

In this touch panel 20, as shown in FIG. 2, the lower surface of the front design sheet 27 and the upper surface of the upper film substrate 21 are bonded to each other by an optically transparent material 28 (optically transparent double-sided tape (OCA) or optically transparent resin (OCR)).

The configuration of a touch panel constituting a third embodiment of the fixing structure for the touch panel and the front design sheet according to the present invention will now be described with reference to FIG. 3.

Figure 3:
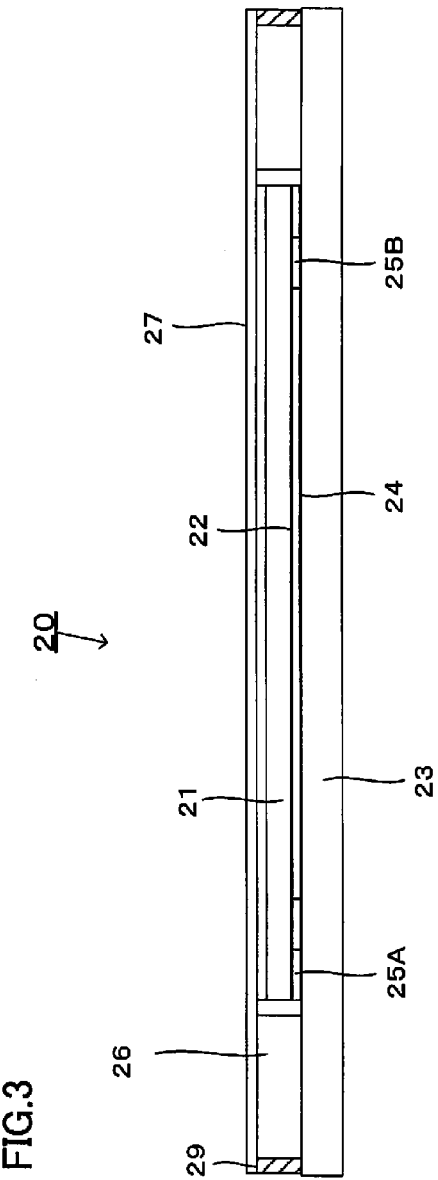
FIG. 3 is a view illustrating the configuration of a touch panel constituting a third embodiment of the fixing structure for the touch panel and the front design sheet according to the invention.

In this touch panel 20, as shown in FIG. 3, the outer periphery of the adhesive or the double-sided tape 26 that secures the front design sheet 27 and the lower glass substrate 23 is sealed and protected by a resin (resin seal 29), whereby degradation of the adhesive or the double-sided tape 26 can be prevented.

The configuration of a touch panel constituting a fourth embodiment of the fixing structure for the touch panel and the front design sheet according to the present invention will now be described with reference to FIG. 4.

Figure 4:
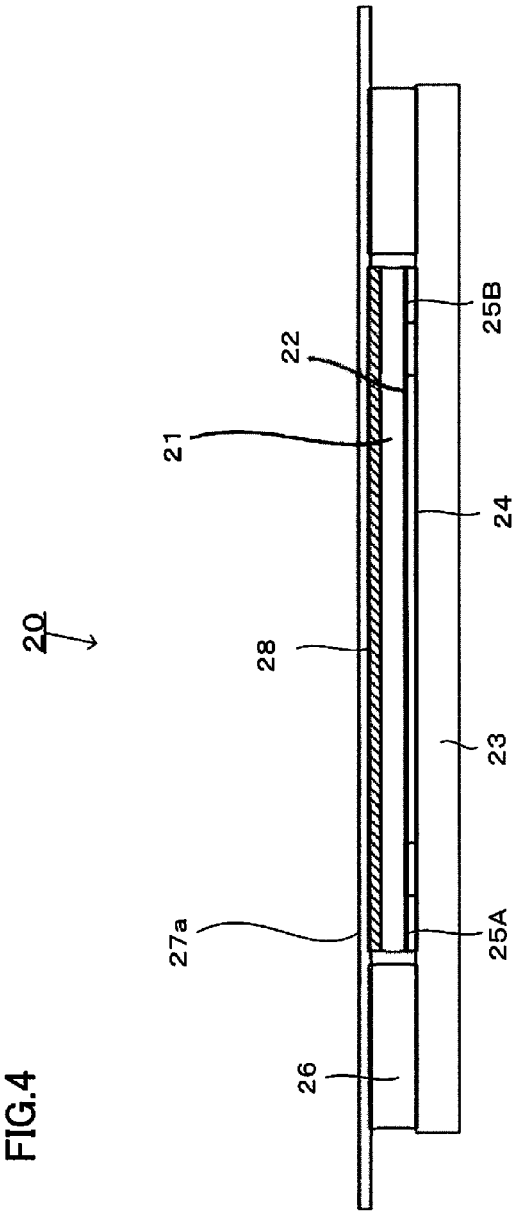
FIG. 4 is a view illustrating the configuration of a touch panel constituting a fourth embodiment of the fixing structure for the touch panel and the front design sheet according to the invention.

In this touch panel 20, the contour of a front design sheet 27*a* projecting from the outer edges of the upper film substrate 21 is made larger than that of the lower glass substrate 23, as shown in FIG. 4. In the touch panels 20 shown in FIGS. 1 to 3, by contrast, the contour of the front design sheet 27 is almost as large as that of the lower glass substrate 23.

Figure 5:
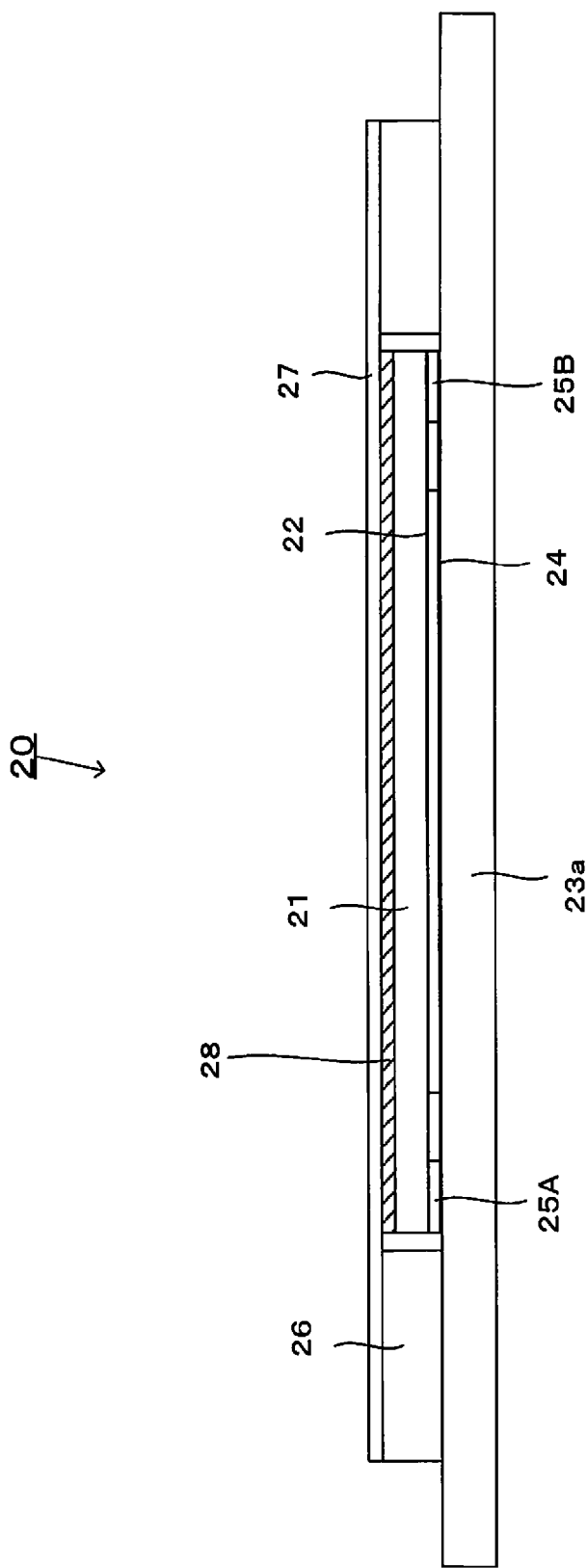
FIG. 5 is a view illustrating the configuration of a touch panel constituting a fifth embodiment of the fixing structure for the touch panel and the front design sheet according to the invention.

The configuration of a touch panel constituting a fifth embodiment of the fixing structure for the touch panel and the front design sheet according to the present invention will now be described with reference to FIG. 5.

In this touch panel 20, the contour of a lower glass substrate 23*a* is made larger than that of the front design sheet 27. In the touch panels 20 shown in FIGS. 1 to 3, by contrast, the contour of the lower glass substrate 23 is almost as large as that of the front design sheet 27.

An example of a display unit 30 with touch panel comprising the fixing structure for the touch panel and the front design sheet according to the present invention will now be described with reference to FIGS. 6 and 7.

The display unit 30 with touch panel includes the touch panel to which the front design sheet according to the present invention shown in FIG. 1 is secured, LCD panel (liquid-crystal display device) 31, housing (bezel) 32, and double-sided tape 33 for touch panel fixation. This touch panel 20 is identical to that shown in FIG. 1 and comprises the light-transmitting upper film substrate 21 and the light-transmitting lower glass substrate 23. The light-transmitting upper conductive layer 22, such as an indium tin oxide layer, is formed on the lower surface of the upper film substrate 21, and the lower conductive layer 24 is formed on the upper surface of the lower glass substrate 23.

Figure 6:
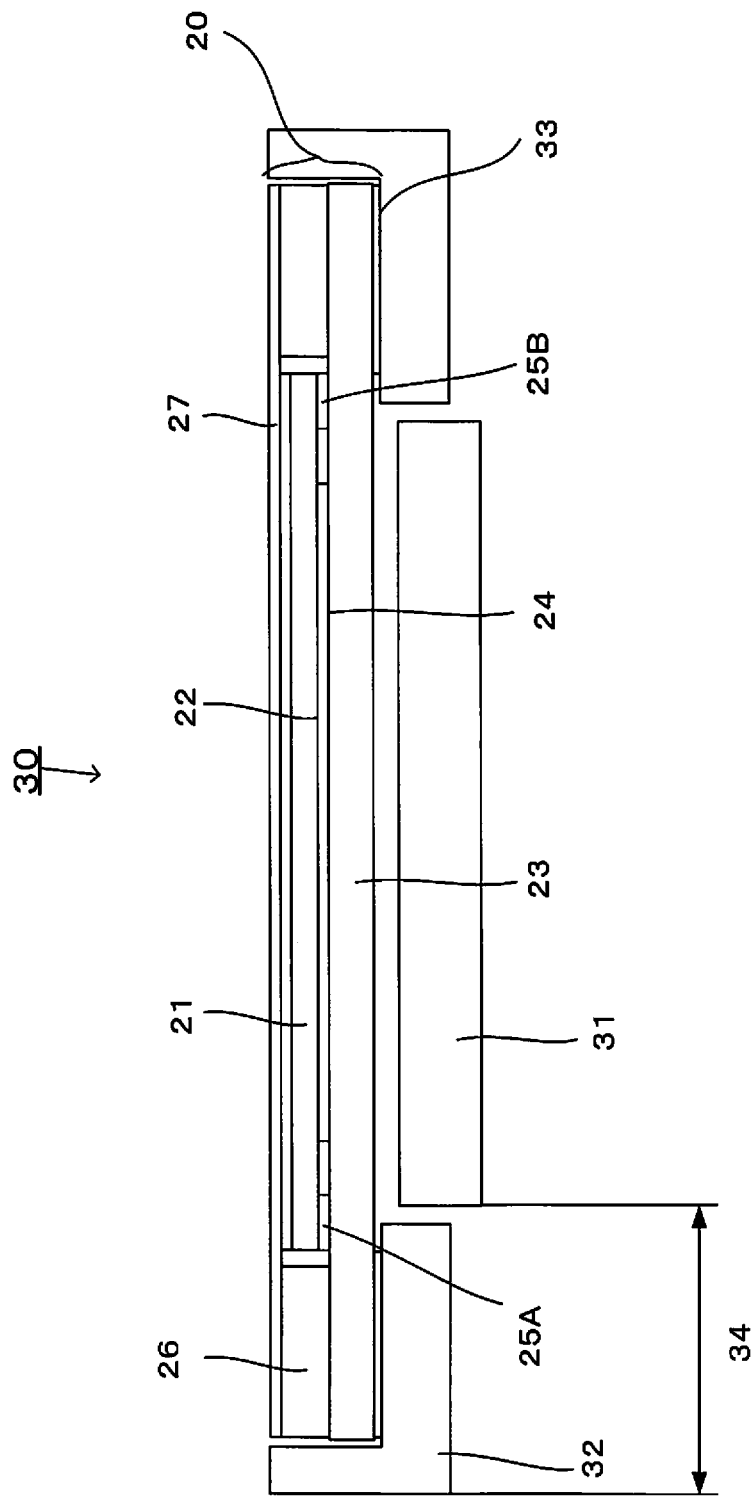
FIG. 6 is a sectional view illustrating an example of a display device with touch panel comprising the first embodiment of the fixing structure for the touch panel and the front design sheet according to the invention.
Figure 7:
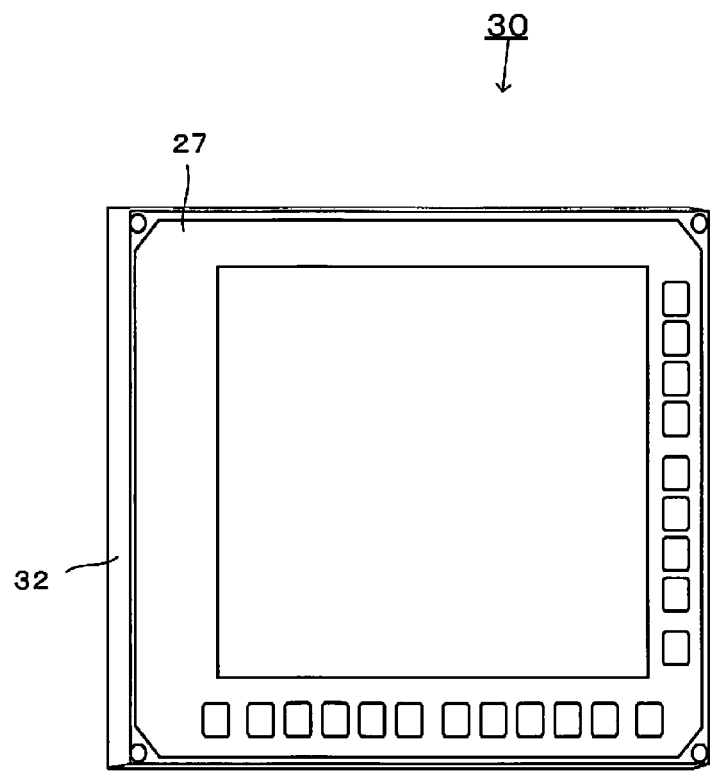
FIG. 7 is an exterior view showing the display unit with touch panel of FIG. 6.
Figure 9:
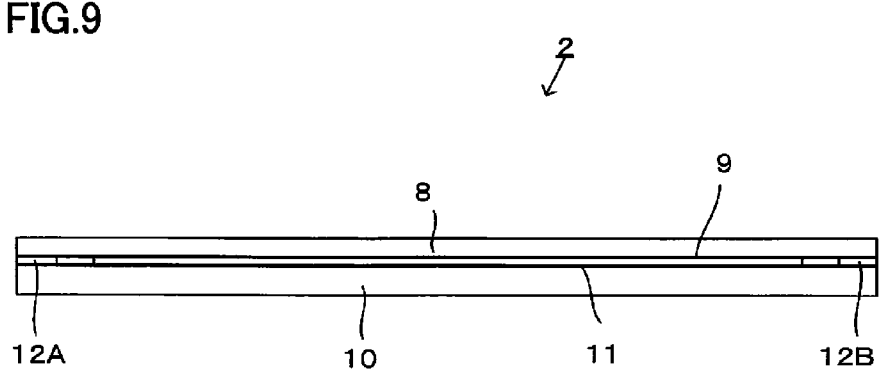
FIG. 9 is a view showing a profile of the touch panel of FIG. 8.

Marks representing buttons are printed on the right and lower sides of the front design sheet 27 on the drawing sheet of FIG. 6, and switches are formed on the reverse side of the drawing sheet of FIG. 6. Since this configuration is well-known, a further description thereof is omitted.

As shown in FIG. 6, the touch panel 20 is disposed above the LCD panel 31. The touch panel 20 is secured to a step portion of the housing 32 by the double-sided tape 33 for touch panel fixation. The front design sheet 27 is disposed on the top of the touch panel 20.

Figure 8:
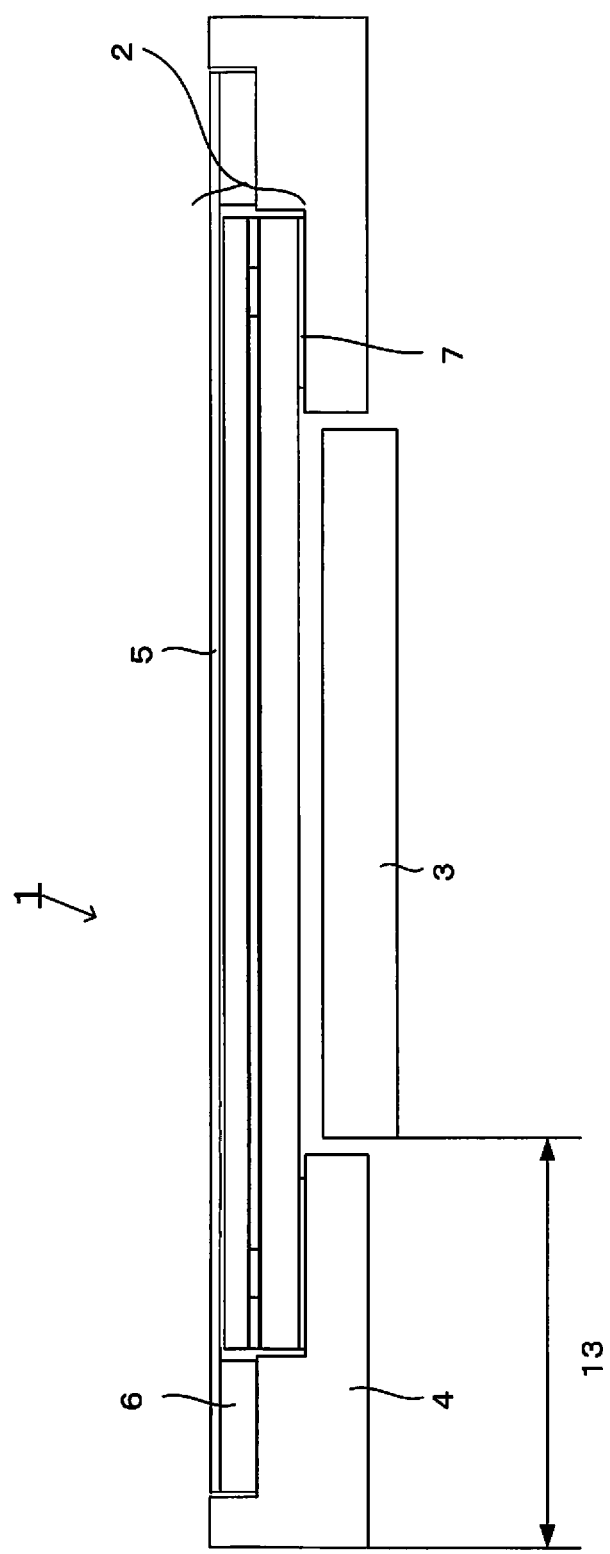
FIG. 8 is a sectional view showing an example of a conventional display unit with touch panel.

In the prior art example shown in FIG. 8, the front design sheet 5 is secured to the second step portion of the housing 4. In the present invention, by contrast, it is not necessary to provide a portion to which the front design sheet is secured in the housing, as a result, the distance (denoted by reference numeral 34 in FIG. 6) from the contour of the display unit 30 to the display area can be reduced, as shown in FIG. 6.

The fixing structure for the touch panel and the front design sheet according to the present invention may be applied to a partial side surface of the touch panel 20. If the width is reduced in consideration of the mounting space for the display unit 30 with touch panel, the fixing structure of the present invention may be applied to the width direction. If the vertical space is limited, moreover, the fixing structure of the present invention may be applied to the vertical direction.

The touch panel 20 may be disposed on the upper surface of the LCD panel 31 in close contact with it or above the LCD panel 31 with a narrow space therebetween.

The touch panel 20 comprises the light-transmitting upper film substrate 21 and the light-transmitting lower glass substrate 23. The light-transmitting upper conductive layer 22, such as an indium tin oxide layer, is formed on the lower surface of the upper film substrate 21. Likewise, the lower conductive layer 24 is formed on the upper surface of the lower glass substrate 23.

The dot spacers (not shown) of an insulating resin are formed at predetermined dot pitches on the upper surface of the lower conductive layer 24. The pair of upper electrode layers 25A and 25B are formed individually on the opposite ends of the upper conductive layer 22. Further, the pair of lower electrode layers (not shown) extending perpendicular to the upper electrode layers 25A and 25B are formed individually on the opposite ends of the lower conductive layer 24. The substantially frame-shaped spacer (not shown) is disposed between the upper film substrate 21 and the lower glass substrate 23 so that the upper conductive layer 22 on the upper film substrate 21 and the lower conductive layer 24 on the lower glass substrate 23 face each other with the predetermined space therebetween. The touch panel 20 shown in FIG. 1 is constructed in this manner.

The upper electrode layers 25A and 25B on the opposite ends of the upper conductive layer 22 and the lower electrode layers on the opposite ends of the lower conductive layer 24 are connected to the electronic circuit (not shown) of the input device through the flexible printed wiring board (not shown). This flexible printed wiring board is formed by covering the wire of, for example, copper foil by the insulating film.

The display unit 30 with touch panel is configured so that if an operator depresses the upper surface of the front design sheet 27 by his/her finger, pen, or the like while visually recognizing the display on the LCD panel 31 on the back of the touch panel 20, the upper film substrate 21 bends so that a depressed part of the upper conductive layer 22 comes into contact with the corresponding part of the lower conductive layer 24. Voltages from the electronic circuit are sequentially applied to the upper electrode layers 25A and 25B and the lower electrode layers (not shown). The electronic circuit detects the depressed part based on the voltage ratio between these electrodes so that various functions of the input device can be changed.

The invention claimed is:

1. A fixing structure for a touch panel and a front design sheet, wherein
the touch panel comprises
an upper film substrate, formed with an electrically conductive layer on the lower surface thereof, and
a lower transparent substrate, formed with an electrically conductive layer on the upper surface thereof and facing the upper film substrate with a predetermined space therebetween,
the front design sheet is disposed above the touch panel,
the front design sheet and the lower transparent substrate are contoured so as to have outer portions projecting outwardly from outer edges of the upper film substrate,
the front design sheet is secured to the lower transparent substrate,
the fixing structure further comprises an attachment member extending around the upper film substrate, and
said attachment member is located between and bonds the outer portions of the front design sheet and the lower transparent substrate that project outwardly from the outer edges of the upper film substrate.

2. The fixing structure according to claim 1, wherein in a cross-section taken in a thickness direction of the touch panel, the front design sheet is almost as large as the lower transparent substrate.

3. The fixing structure according to claim 1, wherein in response to a press on the upper surface of the front design sheet, the upper film substrate is deformed and causes a depressed part of the electrically conductive layer on the lower surface of the upper film substrate to come into contact with a corresponding part of the electrically conductive layer on the upper surface of the lower transparent substrate.

4. The fixing structure according to claim 1, wherein said attachment member is an adhesive layer.

5. The fixing structure according to claim 1, wherein said attachment member is a double-sided adhesive tape.

6. A fixing structure for a touch panel and a front design sheet, wherein
the touch panel comprises an upper film substrate, formed with an electrically conductive layer on the lower surface thereof, and a lower transparent substrate, formed with an electrically conductive layer on the upper surface thereof and facing the upper film substrate with a predetermined space therebetween,
the front design sheet is disposed above the touch panel,
the front design sheet and the lower transparent substrate are contoured so as to partially project outwardly from outer edges of the upper film substrate,
the front design sheet is secured to the lower transparent substrate, and
the fixing structure further comprises an optically transparent material bonding the lower surface of the front design sheet and the upper surface of the upper film substrate to each other.

7. A fixing structure for a touch panel and a front design sheet, wherein
the touch panel comprises an upper film substrate, formed with an electrically conductive layer on the lower surface thereof, and a lower transparent substrate, formed with an electrically conductive layer on the upper surface thereof and facing the upper film substrate with a predetermined space therebetween,
the front design sheet is disposed above the touch panel,
the front design sheet and the lower transparent substrate are contoured so as to partially project outwardly from outer edges of the upper film substrate,
the front design sheet is secured to the lower transparent substrate, and
the fixing structure further comprises:
an adhesive layer which adhesively secures the front design sheet and the lower transparent substrate; and
a resin seal which seals the outer periphery of the adhesive layer.

8. The fixing structure according to claim 7, wherein in a cross-section taken in a thickness direction of the touch panel, the resin seal is confined within outer perimeters of the front design sheet and the lower transparent substrate.

9. A display unit, comprising:
a display device;
a housing;
a touch panel which comprises
an upper film substrate having an electrically conductive layer on the lower surface thereof, and
a lower transparent substrate having an electrically conductive layer on the upper surface thereof and facing the upper film substrate with a predetermined space therebetween;
an attachment member extending around the upper film substrate; and
a front design sheet disposed above the touch panel, wherein
the front design sheet and the lower transparent substrate are contoured so as to have outer portions projecting outwardly from outer edges of the upper film substrate,
the front design sheet is secured to the lower transparent substrate by the attachment member,
said attachment member is located between and bonds the outer portions of the front design sheet and the lower transparent substrate that project outwardly from the outer edges of the upper film substrate, and
the touch panel, to which the front design sheet is secured, is secured to the housing and disposed above the display device.

10. The display unit according to claim 9, wherein in a cross-section taken in a thickness direction of the touch panel, the housing has a stepped structure.

11. The display unit according to claim 9, wherein said attachment member is an adhesive layer.

12. The display unit according to claim 9, wherein said attachment member is a double-sided adhesive tape.

13. A fixing structure for a touch panel and a front design sheet, wherein
the touch panel comprises an upper film substrate, formed with an electrically conductive layer on the lower surface thereof, and a lower transparent substrate, formed with an electrically conductive layer on the upper surface thereof and facing the upper film substrate with a predetermined space therebetween,
the front design sheet is disposed above the touch panel,
the front design sheet and the lower transparent substrate are contoured so as to partially project outwardly from outer edges of the upper film substrate,
the front design sheet is secured to the lower transparent substrate, and
in a cross-section taken in a thickness direction of the touch panel, the front design sheet is smaller than the lower transparent substrate.

* * * * *